United States Patent
Lee

(10) Patent No.: US 6,621,777 B2
(45) Date of Patent: Sep. 16, 2003

(54) COMPLEX OPTICAL DISC PLAYER SYSTEM REPRODUCING OPTICAL DISCS HAVING VARIOUS FORMATS

(75) Inventor: Suk-jung Lee, Yongin (KR)

(73) Assignee: Samsung Electronics Co., Ltd. (KR)

( * ) Notice: Subject to any disclaimer, the term of this patent is extended or adjusted under 35 U.S.C. 154(b) by 58 days.

(21) Appl. No.: 09/836,060

(22) Filed: Apr. 16, 2001

(65) Prior Publication Data

US 2002/0001267 A1 Jan. 3, 2002

(30) Foreign Application Priority Data

Aug. 30, 2000 (KR) ......................................... 2000-50785
Jun. 20, 2000 (KR) ......................................... 2000-33840

(51) Int. Cl.[7] ............................................... G11B 5/09
(52) U.S. Cl. ................................. 369/47.24; 369/59.13
(58) Field of Search ......................... 369/47.15, 47.16, 369/47.2, 47.23, 47.24, 47.28, 47.32, 47.44, 53.13, 53.18, 53.31, 59.13, 59.14

(56) References Cited

U.S. PATENT DOCUMENTS 6,332,175 B1 * 12/2001 Birrell et al. ............ 369/30.23
6,426,927 B2 * 7/2002 Kamatani ................ 369/47.19

* cited by examiner

Primary Examiner—Paul W. Huber
(74) Attorney, Agent, or Firm—F. Chau & Associates, LLP

(57) ABSTRACT

An optical disc player system for reproducing optical discs is provided. The system includes a digital signal processor for processing a data signal having a format read from an optical disc and reproducing the optical disc. The system includes a plurality of decoders for decoding data of different formats. The system includes a data output unit which selects the data output from the digital signal processor or the decoded data output from the decoders. The data output unit converts the selected data into an analog signal and outputs the converted signal to a corresponding channel. A controller enables one of the decoders depending on the data format of the optical disc and controls the selection operation of the data output unit, and a buffer memory for storing data output from the plurality of decoders depending to the data format or operation mode of the optical disc.

20 Claims, 7 Drawing Sheets

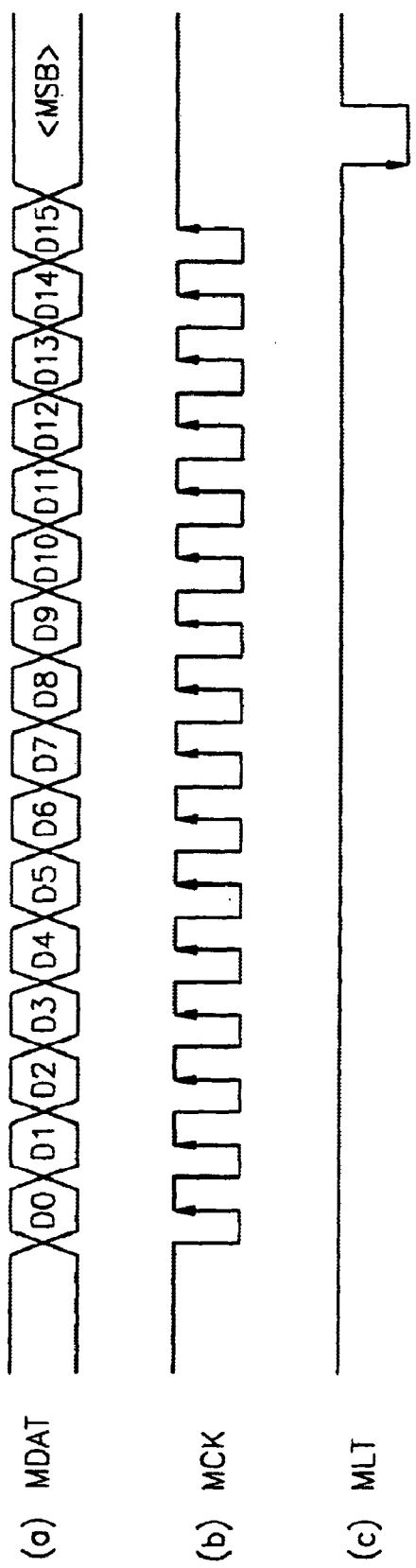

COMPLEX OPTICAL DISC PLAYER SYSTEM REPRODUCING OPTICAL DISCS HAVING VARIOUS FORMATS

BACKGROUND OF THE INVENTION

1. Field of the Invention

The present invention relates to an optical disc player system, and more particularly, to an optical disc player system for reproducing optical discs having various formats.

2. Description of the Related Art

Generally, an optical disc format originates from a compact disc (CD)-audio format referred to as a compact disc-digital audio (CD-DA). CD-DA has extended to various formats, including a compact disc-read only memory (CD-ROM), a compact disc-interactive (CD-I), a compact disc-graphic (CD-G), a video-CD, and a digital versatile disc (DVD). In line with the diverse optical disc formats, the diversity of CD types has also increased.

Various optical disc systems exist having different features. For example, a CD player for an CD-DA formatted disc may include a spindle/focus/tracking servo, a digital signal processor, and a digital-analog converter (DAC), and a system for reproducing audio data. A portable CD player may include a controller for preventing a shock to the CD-DA format player and a buffer memory. Therefore, an external shock and data loss due to vibration can be prevented in the portable CD player system. As for a video CD, a video CD player includes a CD-DA format has a CD-ROM decoder, an MPEG decoder and a buffer memory. Therefore, the video CD player system can reproduce video and audio data by restoring compressed digital data stored on a disc. A CD-MP3 player stores MP3 data in a relatively inexpensive CD and reproduces the stored MP3 data. A flash-type MP3 player stores MP3 data in a flash memory, instead of a CD, and reproduces the stored MP3 data.

Currently, systems which support multiple formats include redundant elements for avoiding signal or bus contention. However, more hardware may be needed in such a system and the size of such system may be larger than the components which it replaces. Therefore, a need exists for an optical disc player system and method which can reproduce optical discs having various formats and avoid bus contention using multiple decoders.

SUMMARY OF THE INVENTION

To solve the above problems, it is an object of the present invention to provide an optical disc player system which can reproduce optical discs having various formats.

To accomplish the above object of the present invention, there is provided an optical disc player system including a digital signal processor for processing a data signal having a data format read from an optical disc and reproducing the optical disc. The optical disc player system includes a plurality of decoders for decoding data of different formats, the data output from the digital signal processor. Further, the system includes a data output unit selecting one of the data output from the digital signal processor and a decoded data output from the decoders, converting the selected data into an analog signal, and outputting the converted signal to a corresponding channel, and a controller for enabling one of the decoders depending on the data format of the data signal and controlling the selection operation of the data output unit. The system also includes an interface circuit for receiving a predetermined data from an external host computer and sending the predetermined data to one of the plurality of decoders, and a buffer memory for storing the data output from the plurality of decoders depending on one of the data format of the data signal and an operation mode of the optical disc, and outputting a stored data to the decoders.

The interface circuit includes a host interface unit for receiving compressed audio data from a host computer, and a flash memory for storing a compressed audio data, wherein the operation of the interface circuit is controlled by the controller.

The system further includes an anti-shock memory controller which stores the data output from the digital signal processor in the buffer memory, and upon an anti-shock function, the controller providing the stored data to the data output unit through the anti-shock controller.

Each of the plurality of decoders has at least one internal tri-state buffer for communicating the decoded data with the data output unit and the buffer memory. The anti-shock memory controller has at least one internal tri-state buffer for communicating data output from the digital signal processor with the data output unit and the buffer memory. The buffer memory has at least one internal tri-state buffer for communicating the data output from the decoders with the plurality of decoders and the anti-shock memory controller.

The controller controls the operations of the tri-state buffers according to at least one of the sub code and main data of the data signal from the optical disc. The controller controls the operations of the tri-state buffers according to at least one of the sub code and main data of the data signal from the optical disc. The controller controls the operations of the tri-state buffers according to at least one of the sub code and main data of the data signal from the optical disc.

According to an embodiment of the present invention, a method is provided for processing data signal read from an optical disc having a format and reproducing the optical disc.

The method includes decoding data having the formats, the data output from a digital signal processor, selecting one of the data output from the digital signal processor and a decoded data output from a decoder, and converting the selected data into an analog signal. The method further includes outputting the converted signal to a corresponding channel, enabling a decoder depending on the format of the data signal, storing the data output from the decoder depending on one of the data format and an operation mode of the optical disc, and outputting a stored data to a data output unit.

The method includes receiving compressed audio data from a host computer, and storing a compressed audio data. The method further includes storing the data output from a digital signal processor in a buffer memory, and providing the stored data to a data output unit through an anti-shock controller upon an anti-shock function.

BRIEF DESCRIPTION OF THE DRAWINGS

The above objects and advantages of the present invention will become more apparent by describing in detail a preferred embodiment thereof with reference to the attached drawings in which:

FIGS. 7A through 7C are waveforms showing the operation of the optical disc player shown in FIG. 6.

DETAILED DESCRIPTION OF THE INVENTION

Hereinafter, embodiments of the present invention will be described in detail with reference to the attached drawings. Elements depicted in different figures which perform similar functions may have identical reference numbers. The present invention is not restricted to the following embodiments, and many variations are possible within the spirit and scope of the present invention. The embodiments of the present invention are provided in order to more completely explain the present invention to one skilled in the art.

Figure 1:
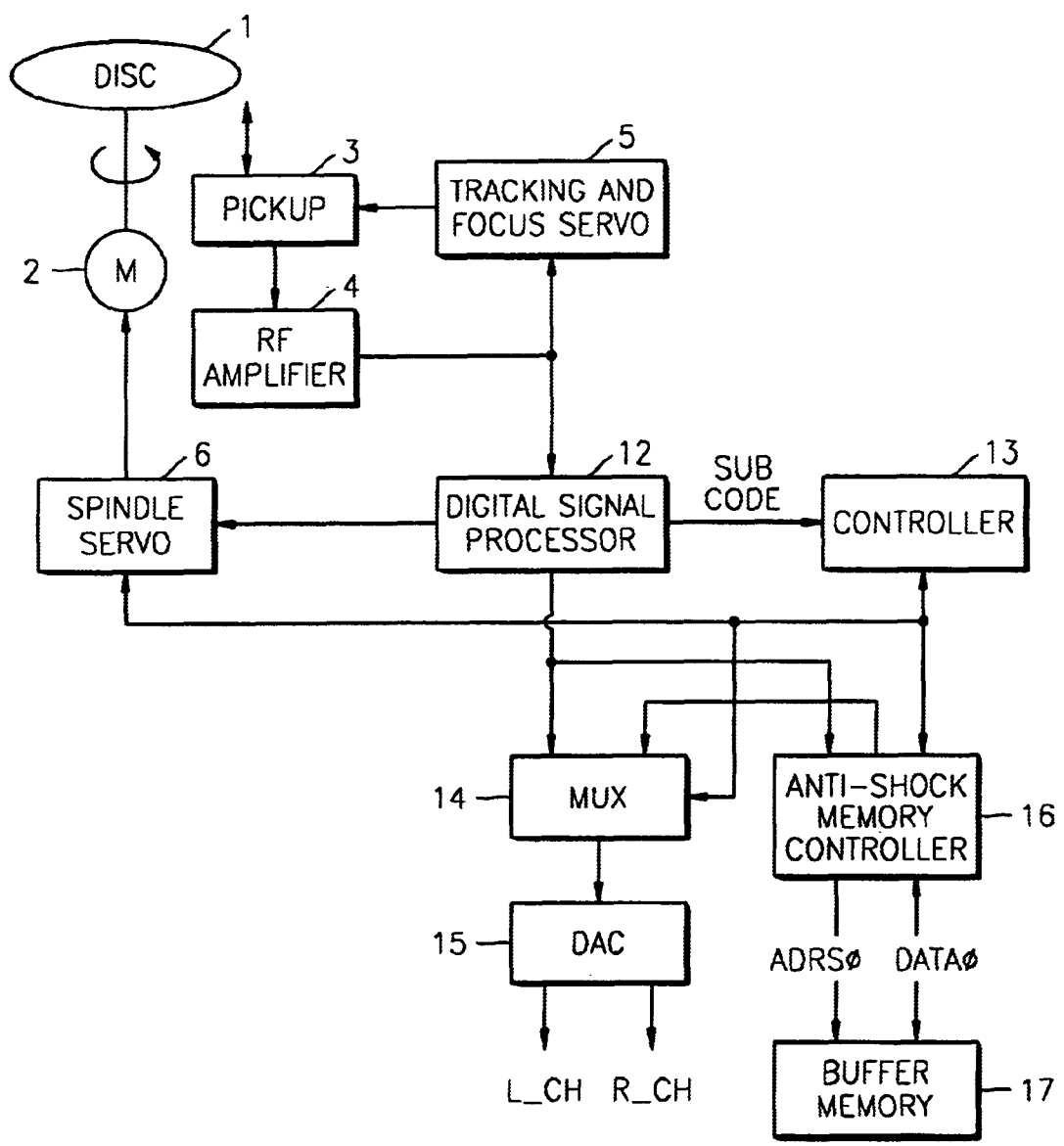
FIG. 1 is a block diagram showing the structure of a compact disc (CD) player which reproduces a CD having an ordinary compact disc-digital audio (CD-DA) format and has an anti-shock function.

FIG. 1 is a block diagram showing the structure of a compact disc (CD) player which reproduces a CD having a compact disc-digital audio (CD-DA) format and which also includes an anti-shock function.

Referring to FIG. 1, a digital signal processor 12 performs eight-to-fourteen modulation (EFM) demodulation and error correction of a radio frequency (RF) signal output from a tracking and focus servo 5. A controller 13 controls the operation of each block based on signals provided directly or indirectly from a spindle servo 6, the digital signal processor 12, and the tracking and focus servo 5. A multiplexer 14 receives from the digital signal processor 12 or an anti-shock memory controller 16. The multiplexer 14 provides data to a digital-analog converter (DAC) 15. When an anti-shock function is not needed, the controller 13 controls the multiplexer 14 so that data output from the digital signal processor 12 is provided to the DAC 15.

When a pickup 3 having a laser light source is effected by an external shock, distortion may occur in an RF signal output from the pickup 3. As a result, the digital signal processor 12 may not process the input signal correctly. An anti-shock memory controller 16, controlled by the controller 13, causes a buffer memory 17 to store data output from the digital signal processor 12 for a predetermined time. When an operation for preventing a shock is needed, the anti-shock memory controller 16 provides data stored in the buffer memory 17 (DATA0) to the multiplexer 14.

Figure 2:
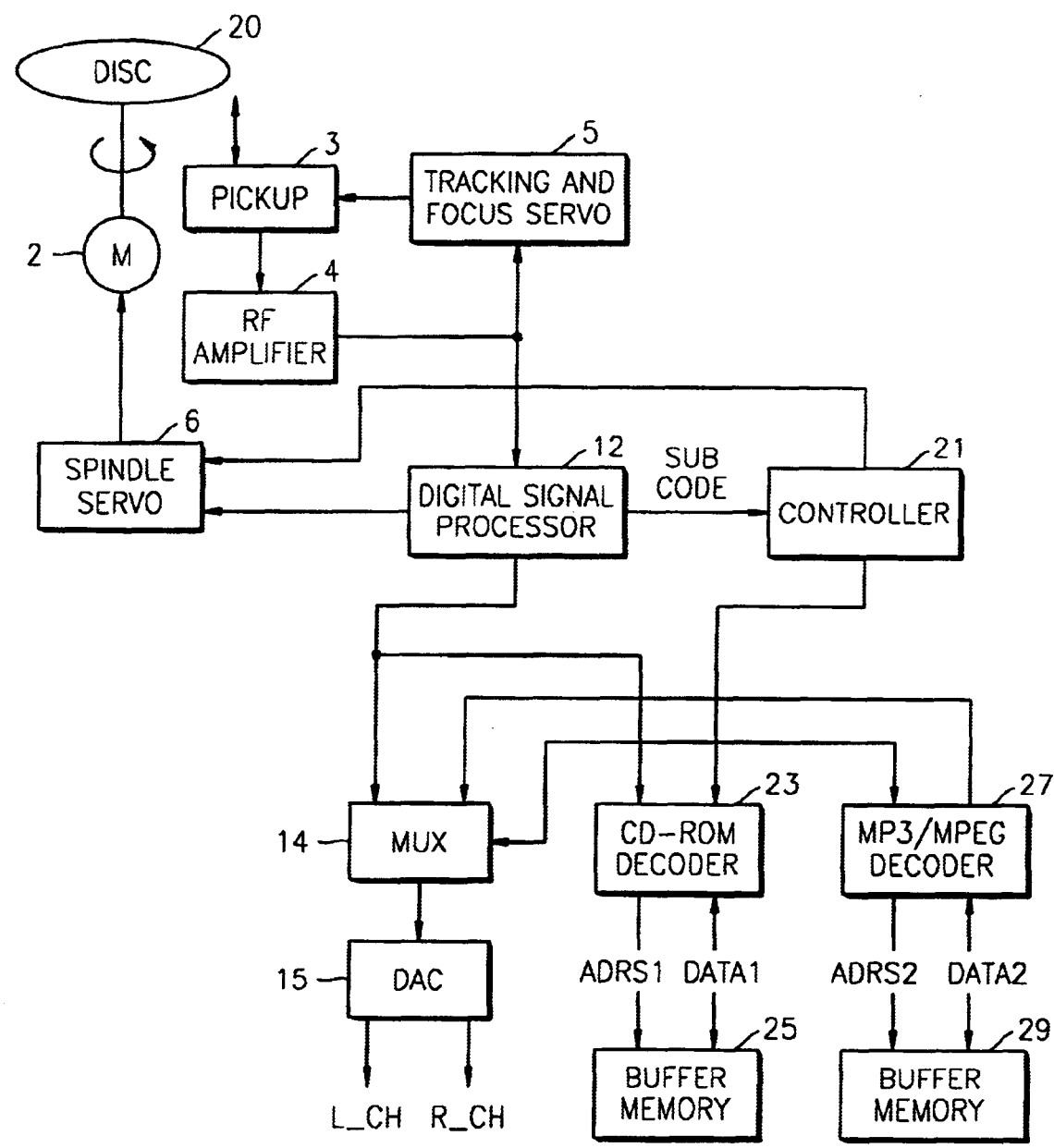
FIG. 2 is a block diagram showing the structure of a CD player for reproducing a CD having an ordinary compact disc-read only memory (CD-ROM) format.

FIG. 2 is a block diagram showing the structure of a CD player for reproducing a CD having a CD-ROM format such as a video-CD or CD-MP3. It is assumed that the optical disc 20 shown in FIG. 2 stores MP3 audio data using a CD-ROM format.

Referring to FIG. 2, a controller 21 controls the operations of a CD-ROM decoder 23 and an MP3/MPEG decoder 27, when an optical disc 20 having a CD-MP3 format is loaded on the deck (not shown) of a CD player. The CD-ROM decoder 23 decodes data provided from the digital signal processor 12 and stores the data in a buffer memory 25. The CD-ROM decoder 23 provides decoded data to the MP3/MPEG decoder 27. The MP3/MPEG decoder 27 decodes data output from the CD-ROM decoder 23 using a buffer memory 29, and outputs audio data. The MP3/MPEG decoder 27 uses an address (ADRS2) in storing or reading data (DATA2) in the buffer memory 29. Audio data output from the MP3/MPEG decoder 27 is provided to the multiplexer 14.

When a CD player is implemented by combining the CD players shown in FIGS. 1 and 2, a new structure for efficiently using the buffer memories (17 in FIG. 1, and 25 and 29 in FIG. 2) is needed. Also, in a data bus connecting the anti-shock memory 16, the MP3/MPEG decoder 27 and the multiplexer 14, prevention of bus contention by output from the anti-shock memory controller 16 and the MP3/MPEG decoder 27 is needed.

Referring to the attached drawings, an optical disc player system which can reproduce optical discs having various formats according to the present invention will now be explained.

Figure 3:
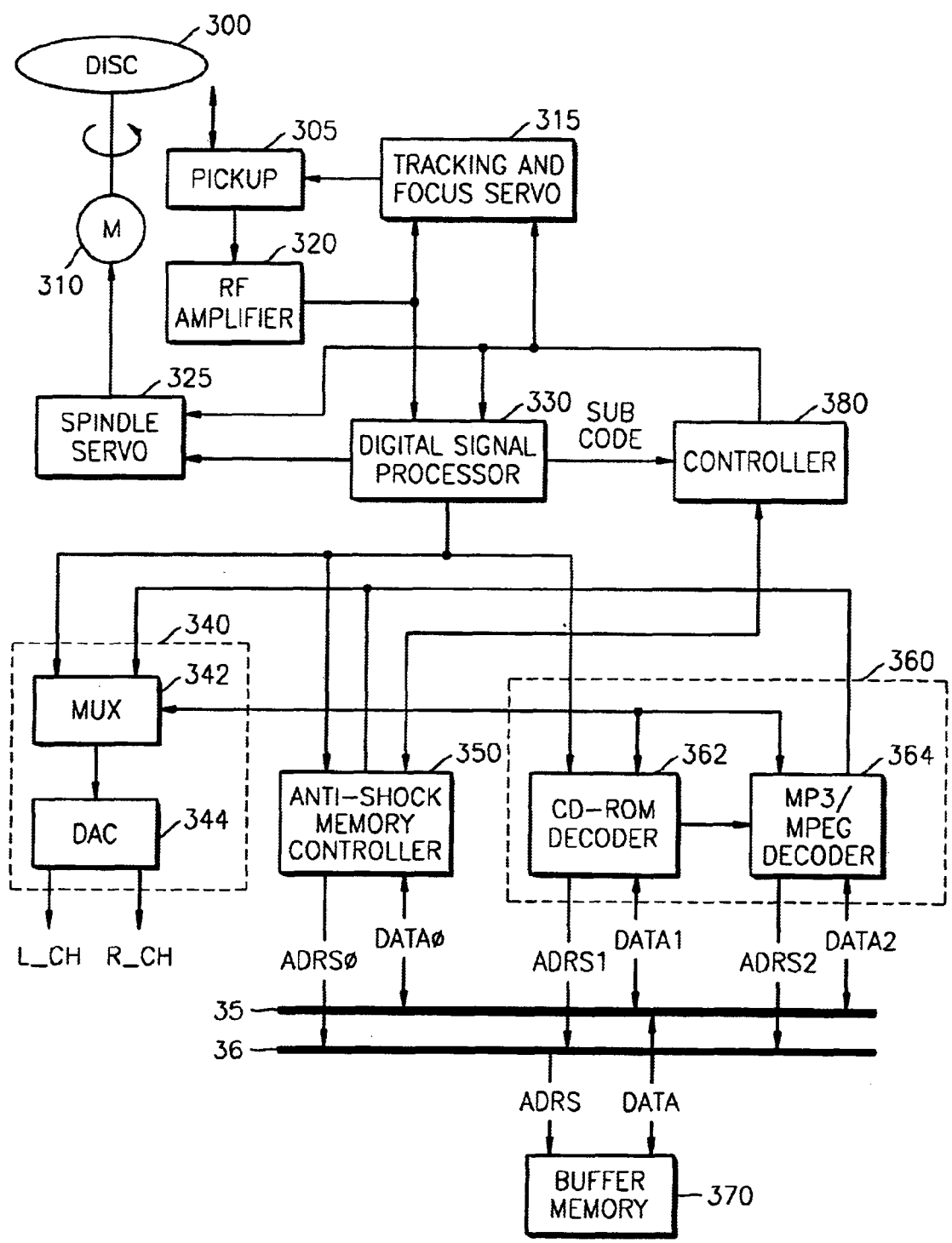
FIG. 3 is a block diagram showing an optical disc player system which can reproduce optical discs having various format according to an embodiment of the present invention.

FIG. 3 is a block diagram showing a compact disc (CD) player which can reproduce optical discs having various formats according to an embodiment of the present invention. Referring to FIG. 3, the CD player system has a pickup 305, a spindle motor 310, a tracking and focus servo 315, an RF amplifier 320, a spindle servo 325, a digital signal processor 330, a controller 380, a data output unit 340, an anti-shock memory controller 350, a decoding unit 360, and a buffer memory 370.

The CD player system shown in FIG. 3 is a player system which reproduces optical discs having a CD-DA format and various CD-ROM formats, such as CD-DA format, video-CD format, and CD-MP3 format. The player system also includes an anti-shock function.

Referring to FIG. 3, the optical disc 300 is rotated by the spindle motor 310. Using a light beam, the pickup 310 reads a signal written on the optical disc 300. The signal read from the optical disk, the read signal, is output as an RF signal.

The RF amplifier 320 amplifies the RF signal received from the pickup 305. The amplified RF signal is provided to the tracking and focus servo 315 and the digital signal processor 330.

Based on the RF signal, the tracking and focus servo 315 controls the tracking and focusing of the pickup 305 on the optical disc 300. Here, the RF signal, which the RF amplifier 320 provides to the digital signal processor 330, is an eight-to-fourteen modulation (EFM) signal which is EFM-modulated.

The digital signal processor 330 generates a servo control signal to control the spindle servo 325, using the EFM signal. The spindle servo 325 controls the rotational motion of the spindle motor 310 in response to the servo control signal. The digital signal processor 330 performs error correction for the input RF signal, using an EFM demodulation and a Cross-Interleave Reed-Solomon Code (CIRC). The digital signal processor 330 separates sub code and data from the input RF signal when the input RF signal is provided to the digital signal processor 330 through the pickup 305 and the RF amplifier 320. At this time, the sub code is input to the controller 380, and data is input to the multiplexer 342 of the audio data output unit 340, the anti-shock memory controller 350, and the CD-ROM decoder 362 of the decoding unit 360.

The controller 380 controls the multiplexer 340, the anti-shock memory controller 350, the CD-ROM decoder 362, and the MP3/MPEG decoder 364, based on the sub code from the digital signal processor 330. The controller 380 can be implemented in a controller, processor, or a computer.

The anti-shock memory controller 350 stores data output from the digital signal processor 330 in the buffer memory 370. When an anti-shock function is needed, the stored data is passed to the multiplexer 342 without change or after restoration. At this time, the anti-shock memory controller 350 is controlled by the controller 380.

The decoding unit 360 decodes data having various formats, for example, video-CD or CD-MP3 data, output from the digital signal processor 330. In an embodiment of FIG. 3, the decoding unit 360 has a CD-ROM decoder 362 and an MP3/MPEG decoder 364. When an optical disc 300 which the CD player wants to reproduce has a CD-ROM format, using the buffer memory 370, the CD-ROM decoder 362 decodes data output from the digital signal processor 330, and then outputs the decoded data to the MP3/MPEG decoder 364. The MP3/MPEG decoder 364 decodes data output from the CD-ROM decoder 362, using the buffer memory 370. Here, the MP3/MPEG decoder 364 can be implemented as an MP3 audio-dedicated decoder or an MPEG decoder which can decode MP3 audio. In the decoding unit 360 of FIG. 3, decoder 362 and 364 are controlled by the controller 380. The decoding unit 360 has a CD-ROM decoder 362 and an MP3/MPEG decoder 364 in FIG. 3. Depending upon the particular design of the player, the decoding unit 360 can have other decoders.

Referring to FIG. 3, the data output unit 340 selects and converts data output from the digital signal processor 330, the decoding unit 360, or the anti-shock memory controller 350 to analog audio signal. The data output unit 340 then outputs the converted signal to the corresponding channel. For this operation, the data output unit 340 includes a multiplexer 342 and a DAC 344. The multiplexer 342 selectively outputs the input data according to the controller 380. The DAC 344 converts digital data output from the multiplexer 342 into an analog signal and then outputs the analog signal through an L channel (L_CH) and R channel (R_CH).

Referring to FIG. 3, the anti-shock memory controller 350, the CD-ROM decoder 362, and the MP3/MPEG decoder 364 are linked to the buffer memory 370 through an address bus 35 and data bus 36.

According to the data format or the operation mode of the optical disc, the buffer memory 370 stores data output from the decoding unit 360 or the anti-shock memory controller 350, and provides the stored data to the decoding unit 360 and the anti-shock memory controller 350.

More specifically, the operation of the CD player system of FIG. 3 will now be explained.

When an optical disc having a CD-DA format is loaded on the deck (not shown) of the CD player, the controller 380 enables the anti-shock memory controller 350. When an anti-shock operation is needed, the controller 380 controls the multiplexer 342 so that data output from the anti-shock memory controller 350 is provided to the DAC 344 through the multiplexer 342. For this operation, the anti-shock memory controller 350 stores a signal provided from the digital signal processor 330 in the buffer memory 370 without change or after compressing the signal. That is, the anti-shock memory controller 350 provides an address (ADRS0) to the buffer memory 370 through the address bus 35. The anti-shock memory controller 350 provides predetermined data (DATA0) to the buffer memory 370 through the data bus 36 in response to the address (ADRS0). Data (DATA0) stored in the buffer memory 370 is maintained for a predetermined time. Therefore, when an anti-shock operation is needed, the controller 380 generates a predetermined control signal so that data stored in the buffer memory 370 is provided to the DAC 344 through the anti-shock memory controller 350 and the multiplexer 342. The anti-shock memory controller 350 which responds to the operation provides data read from the buffer memory 370 to the multiplexer 342 without change or after restoration.

Further, when an optical disc having a video-CD format or CD-MP3 format, that is, an optical disc having a CD-ROM format is loaded, the controller 380 enables the CD-ROM decoder 362 and the MP3/MPEG decoder 364. The controller 380 controls the multiplexer 342 so that data output from the MP3/MPEG decoder 362 is provided to the DAC 344.

As such, the enabled CD-ROM decoder 362 decodes data output from the digital signal processor 330, using the buffer memory 370. Therefore, any overhead data related to a CD-ROM format is removed from the data output from the digital signal processor 330. At this time, the CD-ROM decoder 362 provides an address (ADRS1) and data (DATA1) to the buffer memory 370 through the address bus 35 and data bus 36, respectively. Data decoded by the CD-ROM decoder 362 is provided to the MP3/MPEG decoder 364. The MP3/MPEG decoder 364 decodes data provided from the CD-ROM decoder 362, using the buffer memory 370.

For example, when the optical disc has a CD-MP3 format, audio data of MPEG1 layer 3 can be stored on the CD. Therefore, the MP3/MPEG decoder 364 restores audio data of MPEG1 layer 3, using the buffer memory 370. When the optical disc has a video-CD format, the MP3/MPEG decoder 364 decodes data provided from the CD-ROM decoder 362, using the buffer memory 370, and restores video and audio data which were compressed according to the MPEG1 specification. When the MP3/MPEG decoder 364 stores data (DATA2) in the buffer memory 370 through the data bus 36, or reads data, the address (ADRS2) is applied to the buffer memory 370 through the address bus 35. From the restored data, the MP3/MPEG decoder 364 provides only audio data to the multiplexer 342. As a result, the DAC 344 of the data output unit 340 receives audio data output from the MP3/MPEG decoder 364 through the multiplexer. Video data output from the MP3/MPEG decoder 364 is provided to a video signal processing block (not shown) thereafter.

When an optical disc having a CD-ROM format and an anti-shock function is needed, the controller 380 enables the anti-shock memory controller 350. As in the case of the CD-DA format, the anti-shock memory controller 350 stores data in the buffer memory 370 and when an anti-shock operation is needed, data stored in the buffer memory 370 is read and provided to the data output unit 340.

Figure 4:
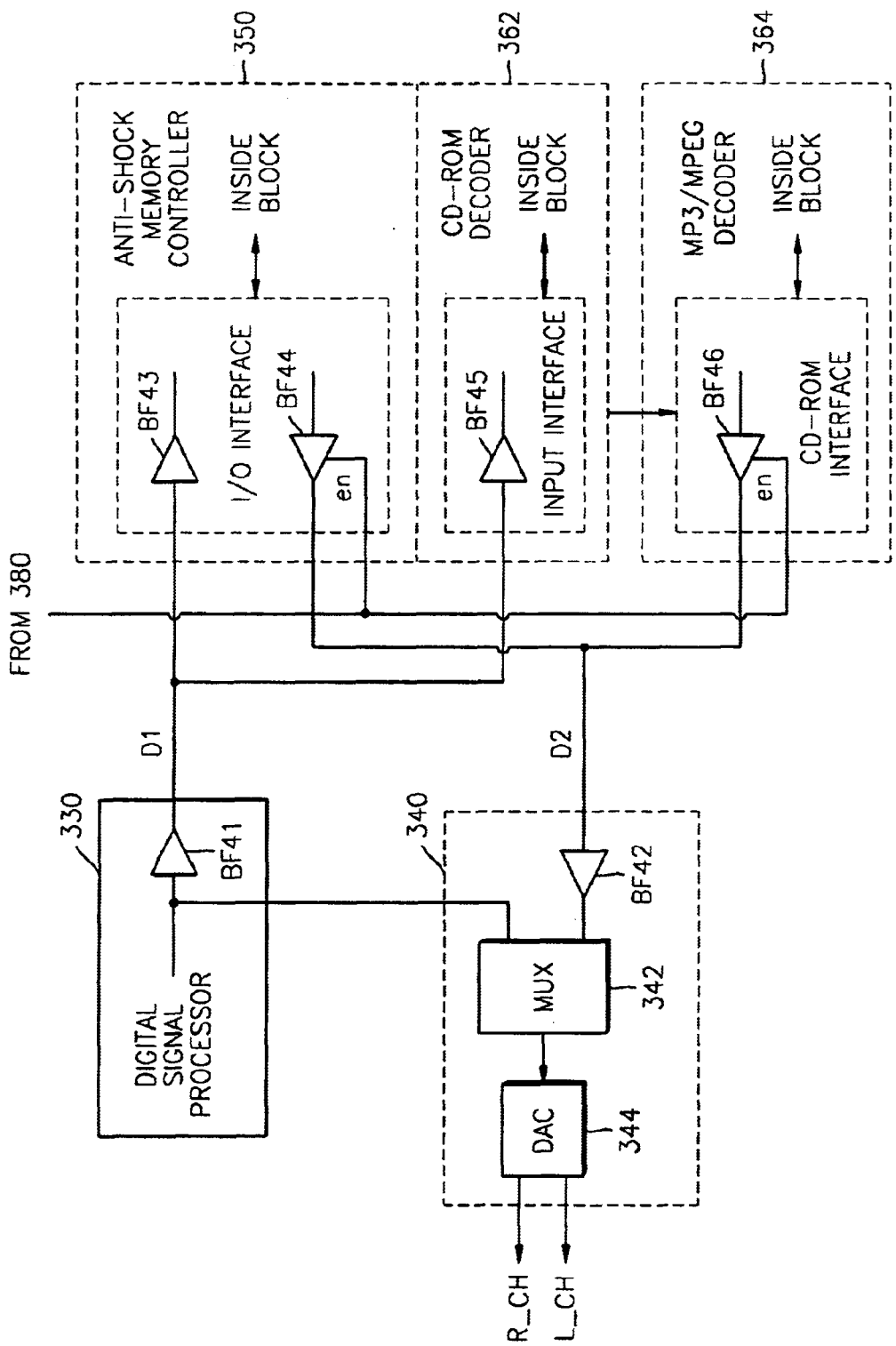
FIG. 4 illustrates a data interface used in the optical disc player shown in FIG. 3.

FIG. 4 illustrates a data interface which may be used in the optical disc player shown in FIG. 3. The data interface of FIG. 4 shows a serial interface between the anti-shock memory controller 350 and the decoding unit 360, and the digital signal processor 330 and the data output unit 340.

Referring to FIG. 4, data processed in the digital signal processor 330 is applied to the multiplexer 342, and through buffer BF41 to the anti-shock memory controller 350, or the CD-ROM decoder 362 of the decoding unit 360. Buffer BF41 of the digital signal processor 330 can be outside the digital signal processor 330. Buffer BF41 buffers data processed in the digital signal processor 330 and provides the data to a corresponding block. In FIG. 4, data which is output from the digital signal processor 330 and input to the anti-shock memory controller 350 or the decoding unit 360 is represented by first data D1. For example, the first data D1 can include serial input data (SDATI), a bit clock signal (BCKI), or an L/R channel clock signal (LRCKI). Here, the serial input data (SDATI) represents serial audio data or data mixing compressed audio and video data. The bit clock signal (BCKI) represents a clock signal for latching serial input data (SDATI). The LR channel clock signal (LRCKI) is a clock signal to distinguish the L-channel (L_CH) and the R-channel (R_CH). For example, if the LR clock signal (LRCKI) is set to a first level, for example, a high level, it indicates that L-channel data is input, and if the LCCKI is set to a second level, for example, a low level, it indicates that R-channel data is input.

In FIG. 4, data output from the anti-shock memory controller 350 or the decoding unit 360 and input to the multiplexer 342 is represented by the second data D2. That is, the second data D2 can include serial output data SDAT0, a bit clock signal BCK0 and a L/R channel clock signal LRCK0.

The data output unit 340 has the anti-shock memory controller 350, or a buffer BF42 for receiving data from the MP3/MPEG decoder 364. Data provided from the anti-shock memory controller 350 or the MP3/MPEG decoder 364 is buffered in buffer BF42. The data in BF42 is applied to the input of the multiplexer 342.

The anti-shock memory controller 350 has a buffer BF43 for inputting data and a buffer BF44 for outputting data. Buffer BF44 provides data from the buffer memory 370 to the multiplexer 342. Buffer BF43 buffers data output from the digital signal processor 330 and provides the data to the inside block of the anti-shock memory controller 350. Preferably, buffer BF44 is implemented in a tri-state buffer of which output signal state is determined by an enable signal (en). This is because buffer BF44 uses the same signal line with other blocks, for example, the decoding unit 360. Therefore, contention among signals output from the other block using the same signal line can be prevented and the operation of transmission by the other block will not be affected. In FIG. 4, buffers BF43 and BF44 can be installed in the input/output (I/O) interface inside the anti-shock memory controller 350. Also, buffers BF43 and BF44 can be installed separately outside the anti-shock memory controller 350. Also, data input through buffer BF43 is provided to the inside block of the anti-shock memory controller 350 through the I/O interface 42. The provided data is compressed by an encoding and then stored in the buffer memory 370. The data read from the buffer memory 370 is decoded and extended inside the anti-shock memory controller 350 and provided to the data output unit 340 through the I/O interface 42.

The CD-ROM decoder 362 has a buffer BF45 for receiving data output from the digital signal processor 330. Also, as shown in FIG. 4, buffer BF45 can be installed inside the input interface 44 inside the CD-ROM decoder 362. That is, data received through buffer BF45 is provided to an internal block (not shown) of the CD-ROM decoder 362. That is, the data provided to the internal block of the CD-ROM decoder 362 is descrambled, and an error correction is performed using the buffer memory 370 or an internal buffer memory (not shown). The overhead data, including the header and sub-header of the CD-ROM format, is removed from the error-corrected data, and the error-corrected data is provided to the MP3/MPEG decoder 364.

The MP3/MPEG decoder 364 has a buffer BF46 for providing data to the multiplexer 342. Buffer BF46 is installed inside the CD-ROM interface 46, and can provide predetermined data to the data output unit 340 through the CD-ROM interface 46. It is preferable that buffer BF46 is implemented using a tri-state buffer of which state is determined by an enable signal (en). Though not shown specifically in the drawings, a DSP core (not shown) is installed inside the MP3/MPEG decoder 364. That is, the data received from the CD-ROM decoder 362 is decompressed and restored in the MP3/MPEG decoder 364, using the DSP core (not shown) and the buffer memory 370. The restored data is provided to the data output unit 340 through buffer BF46 of the MP3/MPEG decoder 364.

The operation of the data interface shown in FIG. 4 will now be explained. The tri-state buffers BF44 and BF46 of each block 350 and 364 are controlled by an enable signal (en) output from the controller 380. That is, according to the enable signal, the tri-state buffers BF44 and BF46 make data pass or cut off. For example, when an enable signal is in the high level, each internal block buffers an input signal and provides the signal to the data output unit 340, and, when the enable signal is in the low level, makes the outputs in the high impedance state so that the input signal is not provided.

When an anti-shock function is needed to perform in the data interface of FIG. 4, the controller 380 enables buffer BF44. Therefore, the data stored in the buffer memory 370 is provided to the multiplexer 342 through buffer BF44. When an anti-shock function is not needed, buffer BF44 is not enabled, and buffers BF45 or BF46 of the decoders 362 and 364 can operate.

As such, the operation of each tri-state buffer is controlled by the controller 380. The controller 380 receives sub code data or main data of data read from the optical disc, from the signal processor 330 and generates a predetermined state signal for controlling the tri-state buffers. The state signal is set differently depending on which elements a CD player system is formed of. For example, when a CD-DA format disc is reproduced, or when a CD-DA format and an anti-shock function is combined, the controller 380 controls the tri-state buffers, using a sub code. Also, when a disc having a CD-ROM format such as video-CD or CD-MP3, the controller 380 can use sub code or main data.

As described above, in an embodiment of FIG. 4, the controller 380 can control the enable of each block 342, 350, 362, and 364, based on not only a sub code but also main data.

Figure 5:
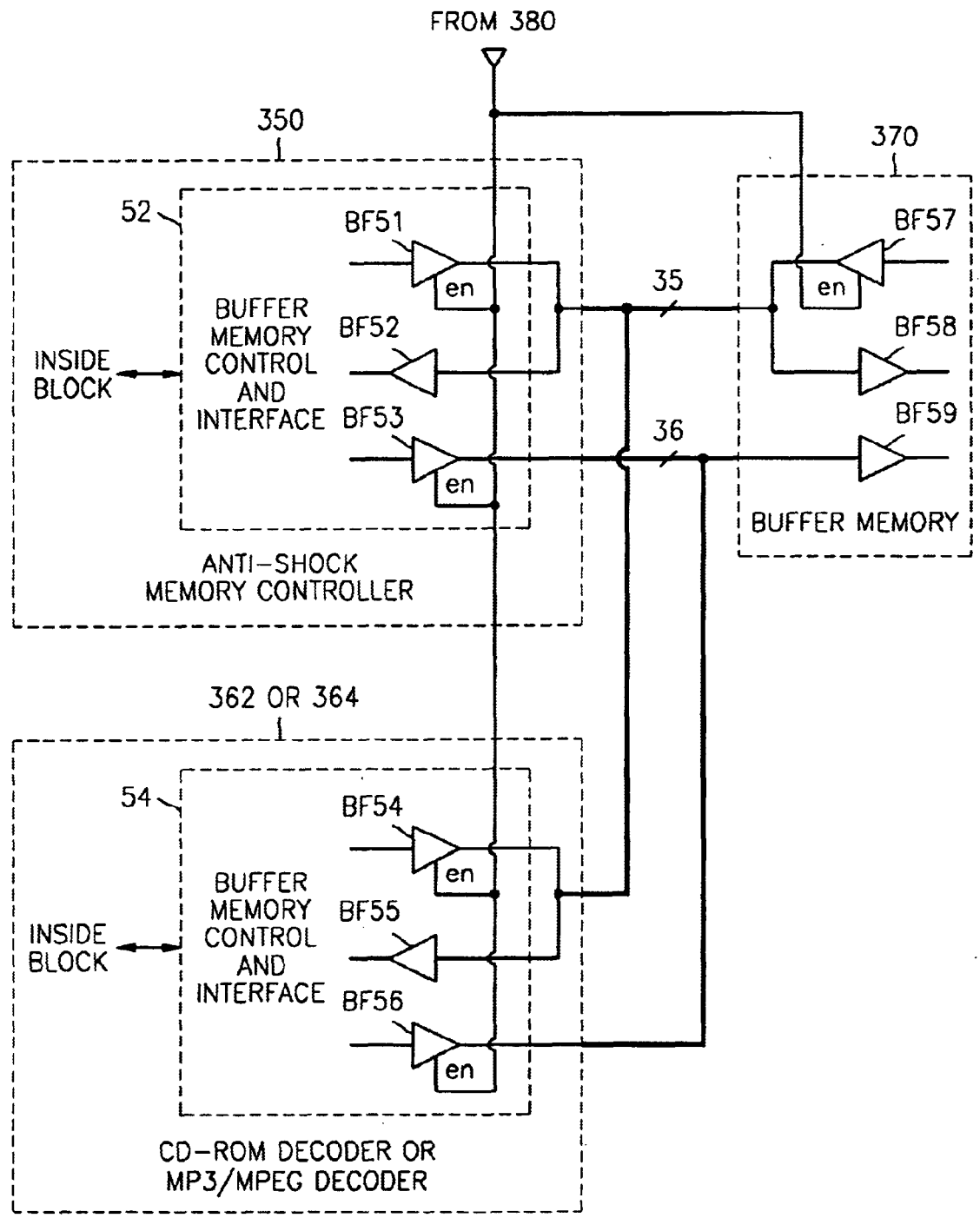
FIG. 5 illustrates another data interface used in the optical disc player shown in FIG. 3.

FIG. 5 illustrates another example of a data interface used in the CD player shown in FIG. 3, and shows a data interface between the anti-shock memory controller 350 and the CD-ROM decoder 362 or the MP3/MPEG decoder 364, and the buffer memory 370.

Referring to FIG. 5, the anti-shock memory controller 350 has buffers BF51, BF52, and BF53, for communicating data with the buffer memory 370. In FIG. 5, buffers BF51, BF52, and BF53 are installed in a buffer memory control and interface 52. Buffer BF51 receives data output from the digital signal processor 330, and sends the received data to the buffer memory 370 through the data bus 35. Buffer BF52 receives data from the buffer memory 370. Buffer BF53 sends an address to the buffer memory 370 through the address bus 36. Here, buffers BF51 and BF53 are implemented in tri-state buffers which are enabled by the controller 380.

The CD-ROM decoder 362 or the MP3/MPEG decoder 364 has buffers BF54, BF55, and BF56 for communicating data with the buffer memory 370. In FIG. 5, buffers BF54, BF55, and BF56 are installed in the buffer memory control and interface 54. Buffer BF54 receives data from the digital signal processor 330, and sends the received data to the buffer memory 370 through the data bus 35. Buffer BF55 receives data from the buffer memory 370 through the data bus 35, and sends the received data to the internal block. Buffer BF56 sends an address to the buffer memory 370 through the address bus 36. Here, buffers BF54 and BF56 are implemented in tri-state buffers which are enabled by the controller 380.

The buffer memory 370 has the anti-shock memory controller 350 and buffers BF57, BF58, and BF59 for communicating data with the decoding unit 360. Buffer BF57 send predetermined data to the anti-shock memory controller 350, the CD-ROM decoder 362, or the MP3/MPEG decoder 364. Buffer BF58 receives predetermined data from the anti-shock memory controller 350, the CD-ROM decoder 362, or the MP3/MPEG decoder 364. Buffer BF59 receives an address from the anti-shock memory controller 350, the CD-ROM decoder 362, or the MP3/MPEG decoder 364. Here, buffer BF57 is implemented in a tri-state buffer which is enabled by the controller 380.

In the operation of the data interface shown in FIG. 5, when an anti-shock function is performed, the output of data and address from the CD-ROM decoder 362 or the MP3/MPEG decoder 364 that share the data bus 35 and the address bus 36 with the anti-shock memory controller 350 is cut off. Therefore, without a data contention, the anti-shock memory controller 350 can communicate data with the buffer memory 370.

When an anti-shock function is not performed, the tri-state buffers BF54 and BF56 are enabled so that transmission of data to the buffer memory 370 can be done. At this time, the tri-state buffers BF51 and BF53 inside the anti-shock memory controller 350 are not enabled.

Figure 6:
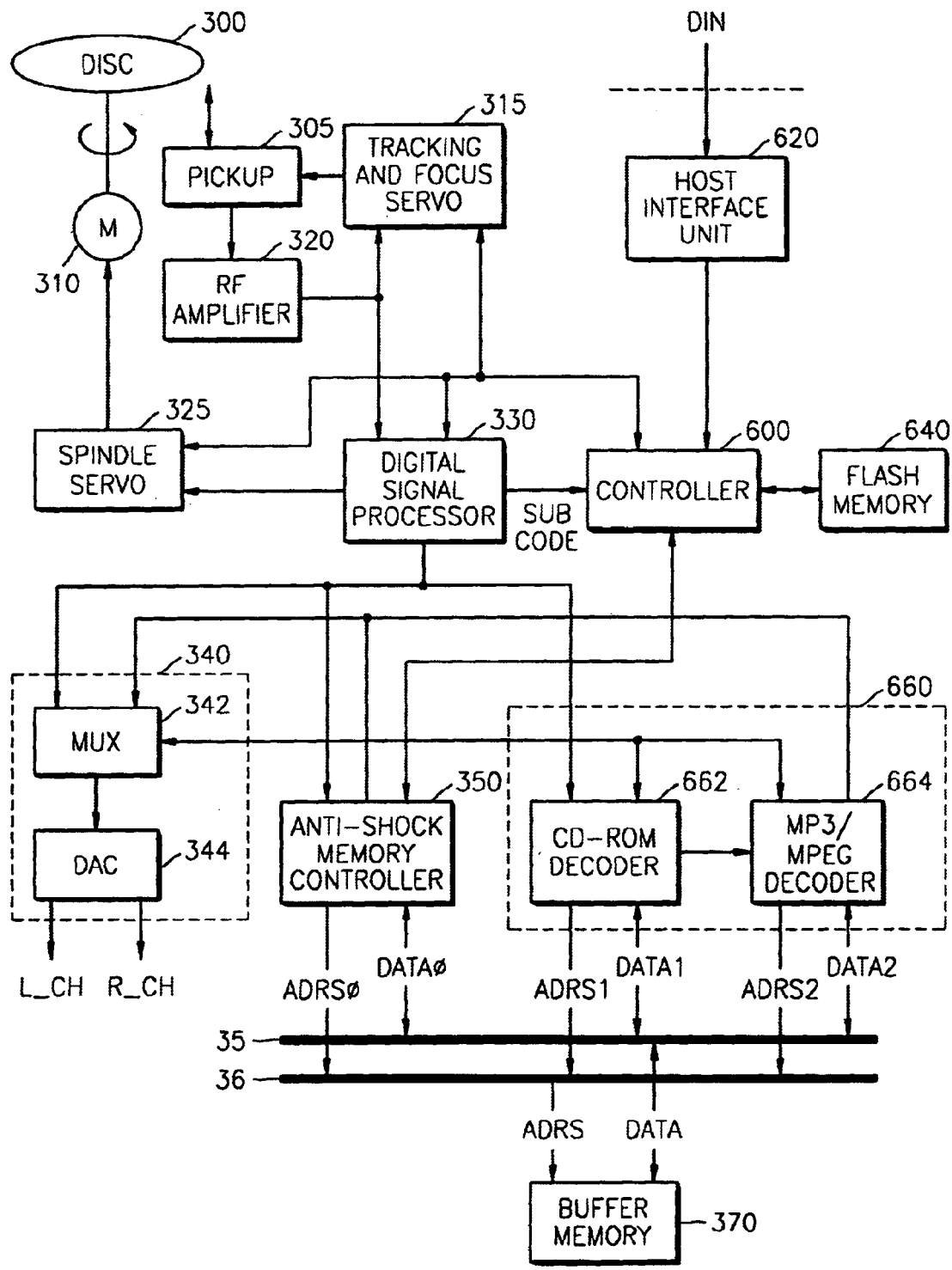
FIG. 6 is a block diagram showing an optical disc player system which can reproduce optical discs having various formats according to another embodiment of the present invention.

FIG. 6 is a block diagram showing an embodiment of a CD player system. Referring to FIG. 6, the CD player system has a pickup 305, a spindle motor 310, a tracking and focus servo 315, an RF amplifier 320, a spindle servo 325, a digital signal processor 330, a controller 600, a data output unit 340, an anti-shock memory controller 350, a decoding unit 660, a buffer memory 670, a host interface unit 620, and a flash memory 640.

Among the elements of the system in FIG. 6, elements having the same functions in FIG. 3 are referred to with the same numerals and detailed explanation will be omitted.

In FIG. 6, the host interface unit 620 performs interfacing for receiving data from an external system, for example, a host computer (not shown).

The controller 600 downloads external data, preferably, compressed audio DIN data such as MP3 data, through the host interface unit 620. The downloaded data can be stored in the flash memory 640 through the controller 600, and can be provided to the MP3/MPEG decoder 664 through the signal line 60. The signal line 60 includes a data line (MDAT) and clock lines (MCK, LRCK).

The flash memory 640 stores the data, which was downloaded from the external computer (not shown), to perform a flash-type MP3 player function. MP3 data stored in the flash memory 640 is decoded and restored in the MP3/MPEG decoder 664, using the buffer memory 670. Here, the host interface unit 620 and the flash memory 640 can be referred to as an external interface circuit. The operation of the external interface circuit is controlled by the controller 600.

As such, in an embodiment of the present invention shown in FIG. 6, the host interface unit 620 and the flash memory 640 are further included and therefore a function for communicating data with the host computer is added.

The anti-shock memory controller 350 and the decoding unit 660 operate similarly in FIG. 3. But, there is a difference in which the MP3/MPEG decoder 664 of the decoding unit 660 can decode MP3 data input externally to the decoding unit 66.

FIGS. 7A through 7C are waveforms showing signals 60 applied from the controller 600 to the MP3/MPEG decoder 664 in the player system shown in FIG. 6. FIG. 7A shows controller data (MDAT), FIG. 7B shows a clock signal (MCK), and FIG. 7C shows a latch clock signal (MLT).

The controller data (MDAT) of FIG. 7A represents system control signals and compressed audio data. The clock signal of FIG. 7B represents a clock signal needed in sending the controller data (MDAT), and the latch clock signal (MLT) of FIG. 7C is a clock signal for indicating that transmission of data is completed.

Referring to FIGS. 6 and 7, the operation of an embodiment of a CD player system will now be explained in detail. Particularly from the aspect of the data communication function added in FIG. 6, the system will be explained.

When a function for data communication with a host computer (not shown) is performed, compressed audio data (for example, MP3 data) is downloaded through the host interface unit 620. The controller 600 stores the downloaded MP3 data in the flash memory 640, or sends to the MP3/MPEG decoder 664 through the signal line 60. As for the signal line 60, a control signal data line which sends a system control signal and other signals is used for the controller data (MDAT) shown in FIG. 7A, in the conventional technology. However, in the present invention, MP3 data which is downloaded using various methods is sent to the MP3/MPEG decoder 664 through the controller data (MDAT) line. For example, responding to the clock signal (MCK) of FIG. 7B, a predetermined address is applied on the data line (MDAT) so that the fact that data to be sent is MP3 data can be indicated. The controller 600 can send a control signal with reference to the data communication function, together with data. When the transmission of MP3 data is completed, the controller 600 sets the latch clock signal (MLT) of FIG. 7C to a predetermined level, for example, to a low level, to indicate that the transmission of data is completed. As such, an existing signal line can be used without using separate address and data lines for transmitting the downloaded MP3 data. With various methods in addition to the methods described above, the controller 600 can send the downloaded MP3 data to the MP3/MPEG decoder 664. The MP3/MPEG decoder 664 decodes the MP3 data sent from the controller 600, using the buffer memory 370. The decoded data is converted to an analog signal through the data output unit 340, and output through the L/R channel (LCH, R_CH).

The functions explained referring to FIG. 6, that is, the operations related to using various decoders and the anti-shock memory controller, are performed similarly to FIG. 3.

The embodiments described above were explained in relation to a CD. However, when the buffer memory 370 or 670 is modified to have a capacity appropriate to the DVD format, an optical disc player having compatibility to a CD and DVD can be implemented in the scope of the present invention which includes an embodiments described above, which would be clear to one skilled in the field of the present invention.

Embodiments according to the present invention have been explained in the drawings and specification, and though specific terminologies are used here, those were only to explain the present invention. Therefore, the present invention is not restricted to the above-described embodiments and many variations are possible within the spirit and scope of the present invention. The scope of the present invention is not determined by the description but by the accompanying claims.

According to the present invention, in implementing a CD player system reproducing optical discs having various formats, an efficient CD player system can be implemented by minimizing external terminals and the size of the system. Also, in one CD player system, a data communication function which enables to download data from an external computer is implemented in addition to the function for reproducing data.

What is claimed is:

1. An optical disc player system having a digital signal processor for processing a data signal having a data format read from an optical disc and reproducing the optical disc, the optical disc player system comprising:

a plurality of decoders which decodes data of different formats, the data output from the digital signal processor;

a data output unit which selects one of the data output from the digital signal processor and a decoded data output from the decoders, converts the selected data into an analog signal, and outputs the converted signal to a corresponding channel;

a controller which enables one of the decoders depending on the data format of the data signal and controls the selection operation of the data output unit; and a buffer memory which stores the data output from the plurality of decoders depending on one of the data format of the data signal and an operation mode of the optical disc, and outputs a stored data to the decoders.

2. The optical disc player system of claim 1, further comprising an anti-shock memory controller which stores the data output from the digital signal processor in the buffer memory, and upon an anti-shock function, the controller provides the stored data to the data output unit through the anti-shock memory controller.

3. The optical disc player system of claim 1, wherein each of the plurality of decoders has at least one internal tri-state buffer for communicating the decoded data with the data output unit and the buffer memory.

4. The optical disc player system of claim 2, wherein the anti-shock memory controller has at least one internal tri-state buffer for communicating data output from the digital signal processor with the data output unit and the buffer memory.

5. The optical disc player system of claim 1, wherein the buffer memory has at least one internal tri-state buffer for communicating the data output from the decoders with the plurality of decoders and the anti-shock memory controller.

6. The optical disc player system of claim 3, wherein the controller controls the operations of the tri-state buffers according to at least one of the sub code and main data of the data signal from the optical disc.

7. The optical disc player system of claim 4, wherein the controller controls the operations of the tri-state buffers according to at least one of the sub code and main data of the data signal from the optical disc.

8. The optical disc player system of claim 5, wherein the controller controls the operations of the tri-state buffers according to at least one of the sub code and main data of the data signal from the optical disc.

9. An optical disc player system having a digital signal processor for processing a data signal having a data format read from an optical disc and reproducing the optical disc, the optical disc player system comprising:

a plurality of decoders which decodes data of different formats, the data output from the digital signal processor;

a data output unit which selects one of the data output from the digital signal processor and a decoded data output from the decoders, converts the selected data into an analog signal, and outputs the converted signal to a corresponding channel;

a controller which enables one of the decoders depending on the data format of the data signal and controls the selection operation of the data output unit;

an interface circuit which receives a predetermined data from an external host computer and sends the predetermined data to one of the plurality of decoders; and a buffer memory commonly connected to the plurality of decoders, which stores the data output from the plurality of decoders depending on one of the data format of the data signal and an operation mode of the optical disc, and outputting a stored data to the decoders.

10. The optical disc player system of claim 9, wherein the interface circuit comprises:

a host interface unit which receives compressed audio data from a host computer; and a flash memory which stores a compressed audio data, wherein the operation of the interface circuit is controlled by the controller.

11. The optical disc player system of claim 9, further comprising an anti-shock memory controller which stores the data output from the digital signal processor in the buffer memory commonly connected to the plurality of decoders, and upon an anti-shock function, the controller provides the stored data to the data output unit through the anti-shock controller.

12. The optical disc player system of claim 9, wherein each of the plurality of decoders has at least one internal tri-state buffer for communicating the decoded data with the data output unit and the buffer memory.

13. The optical disc player system of claim 11, wherein the anti-shock memory controller has at least one internal tri-state buffer for communicating data output from the digital signal processor with the data output unit and the buffer memory.

14. The optical disc player system of claim 9, wherein the buffer memory has at least one internal tri-state buffer for communicating the data output from the decoders with the plurality of decoders and the anti-shock memory controller.

15. The optical disc player system of claim 12, wherein the controller controls the operations of the tri-state buffers according to at least one of the sub code and main data of the data signal from the optical disc.

16. The optical disc player system of claim 13, wherein the controller controls the operations of the tri-state buffers according to at least one of the sub code and main data of the data signal from the optical disc.

17. The optical disc player system of claim 14, wherein the controller controls the operations of the tri-state buffers according to at least one of the sub code and main data of the data signal from the optical disc.

18. A method for processing data signal read from an optical disc having a format and reproducing the optical disc, comprising the steps of:

decoding data having the format, the data output from a digital signal processor;

selecting one of the data output from the digital signal processor and a decoded data output from a decoder;

converting the selected data into an analog signal;

outputting the converted signal to a corresponding channel;

enabling a decoder depending on the format of the data signal;

storing the data output from the decoder depending on one of the data format and an operation mode of the optical disc; and outputting a stored data to a data output unit.

19. The method of claim 18, further comprising the steps of:

receiving compressed audio data from a host computer; and storing a compressed audio data.

20. The method of claim 18, further comprising the steps of:

storing the data output from a digital signal processor in a buffer memory; and providing the stored data to a data output unit through an anti-shock controller upon an anti-shock function.

* * * * *